United States Patent
Peskens et al.

(10) Patent No.: US 11,104,811 B2
(45) Date of Patent: Aug. 31, 2021

(54) SURFACTANTS FOR INTUMESCENT FOAM STABILIZATION

(71) Applicant: PPG Coatings Europe B.V., Amsterdam (NL)

(72) Inventors: Ronnie Peskens, Haarlem (NL); Gregory J. McCollum, Allison Park, PA (US); Venkateshwarlu Kalsani, Gibsonia, PA (US); Seiko Sisco, Glenshaw, PA (US)

(73) Assignee: PPG Coatings Europe BV, Amsterdam (NL)

( * ) Notice: Subject to any disclaimer, the term of this patent is extended or adjusted under 35 U.S.C. 154(b) by 202 days.

(21) Appl. No.: 16/348,809

(22) PCT Filed: Nov. 10, 2017

(86) PCT No.: PCT/EP2017/078932
§ 371 (c)(1),
(2) Date: May 9, 2019

(87) PCT Pub. No.: WO2018/087315
PCT Pub. Date: May 17, 2018

(65) Prior Publication Data
US 2019/0345346 A1    Nov. 14, 2019

Related U.S. Application Data

(60) Provisional application No. 62/420,013, filed on Nov. 10, 2016.

(51) Int. Cl.
  C09D 131/04    (2006.01)
  C09D 5/18      (2006.01)
  C09D 5/02      (2006.01)

(52) U.S. Cl.
  CPC ............. *C09D 5/185* (2013.01); *C09D 5/022* (2013.01); *C09D 5/027* (2013.01); *C09D 131/04* (2013.01)

(58) Field of Classification Search
None
See application file for complete search history.

(56) References Cited

U.S. PATENT DOCUMENTS

| | | | | |
|---|---|---|---|---|
| 4,247,435 A | * | 1/1981 | Kasten | C09D 5/185 106/18.16 |
| 5,225,464 A | * | 7/1993 | Hill, Jr. | C09D 5/185 524/100 |
| 2007/0238800 A1 | * | 10/2007 | Neal | C08G 18/283 521/174 |
| 2015/0291810 A1 | * | 10/2015 | Peskens | C09K 21/10 428/463 |
| 2018/0118909 A1 | | 5/2018 | Jeromenok et al. | |
| 2019/0345346 A1 | * | 11/2019 | Peskens | C09D 5/022 |

FOREIGN PATENT DOCUMENTS

| | | |
|---|---|---|
| CA | 2499114 A1 | 4/2006 |
| EA | 006144 B1 | 10/2005 |
| EP | 3095809 A1 | 5/2015 |
| GB | 2220664 A | 1/1990 |
| GB | 2274459 A | 7/1994 |
| RU | 2174527 C1 | 10/2001 |
| RU | 2219208 C2 | 12/2003 |
| RU | 2521060 C2 | 1/2013 |
| WO | 2007118885 A1 | 10/2007 |

OTHER PUBLICATIONS

Machine English translation of EP3095809A1.

* cited by examiner

*Primary Examiner* — Peter A Salamon
(74) *Attorney, Agent, or Firm* — Lisa Geary

(57) ABSTRACT

Aqueous intumescent coating compositions which include a non-ionic surfactant having a hydrophilic-lipophilic balance (HLB) of 9 to 20, and substrates coated with the coating composition are disclosed. Inclusion of the non-ionic surfactant in the coating compositions is found to reduce char cracking and improve the mechanical strength, cell size, and cell density for intumescent chars formed when coatings deposited from the coating compositions are exposed to open flame and/or elevated temperatures, as compared to the same coatings lacking the non-ionic surfactants.

22 Claims, No Drawings

SURFACTANTS FOR INTUMESCENT FOAM STABILIZATION

RELATED APPLICATION

The present application claims the benefit of prior U.S. Provisional Application No. 62/420,013 filed Nov. 10, 2016, the disclosure of which is incorporated herein by reference in its entirety.

FIELD OF THE INVENTION

The present invention pertains generally to intumescent coating compositions, and more specifically to aqueous intumescent coating compositions formulated with a non-ionic surfactant.

BACKGROUND OF THE INVENTION

Intumescent coating compositions may be applied on substrates, such as metal, wood, and other materials, in the manner of a coating having relatively low film thickness. Upon exposure to fire, heat or flames, the intumescent coating expands considerably in terms of thickness to produce an insulative layer of foamed carbonaceous char. That is, upon heating, the intumescent coating will release gases and decompose to form a carbonaceous char which is then expanded into a foam by the released gases. This thermally stable, foamed, multicellular residue is called "intumescent char", and acts as an insulating layer which protects the underlying substrate by reducing the rate of heating and hence prolongs the time for the substrate to reach critical failure temperatures.

For example, structural steel, a substrate commonly used in the construction industry, loses about 40 percent of its load carrying capacity when its temperature exceeds 500° C., such as in a fire. This is mainly attributed to the high thermal conductivity, low specific heat, and rapid degradation of the yield strength and elasticity modulus of steel. When heated to about 800° C., the steel's load capacity decreases further to about 10 percent of its normal value. Thus, structural steel coated with an intumescent coating, which forms an intumescent char that insulates the steel and slows the rate of heating in a fire event, may provide structures and buildings with improved fire resistance and may prevent or at least delay a structural collapse.

It would be desirable to provide intumescent coating compositions that produce intumescent chars having improved fire performance and/or insulation characteristics, and thus further extend the time for a coated substrate to reach its critical failure temperature.

SUMMARY

The present invention provides an aqueous intumescent coating composition comprising a film forming resin, an acid source, and a non-ionic surfactant having a hydrophilic-lipophilic balance (HLB) of 9 to 20.

The present invention also provides an aqueous intumescent coating composition comprising a film forming resin, an acid source, and a non-ionic silicone surfactant comprising 10 to 50 percent by weight siloxane, 30 to 90 percent by weight alkylene oxide, and a weight average molecular weight of 500 to 12,000 g/mol, wherein the percent by weight is based on the total weight of the non-ionic silicone surfactant in the coating composition.

The present invention also provides substrates coated with the aqueous intumescent coating compositions, and methods for improving the fire performance of coatings deposited from an aqueous intumescent coating composition by addition of a non-ionic surfactant having an HLB of 9 to 20.

DETAILED DESCRIPTION

The present inventors have found that inclusion of a non-ionic surfactant in an intumescent coating composition improves the fire performance of the coating relative to the same coating lacking the non-ionic surfactant. "Fire-performance", as used herein, is related to the formation, due to the action of heat, of the intumescent char which operates as a conventional insulator on the substrate which it coats, increasing the time it takes for the coated structure to fail due to the heat and/or flames of a fire event. An improvement in fire performance of an intumescent coating therefore may result in an increase in the time it takes for the coated structure to fail due to the heat and/or flames of a fire event. This may be due to improvements in the stability, integrity, and mechanical strength (e.g., char adhesion, char cracking, char slumping, char density, air pocket size and/or uniformity, char expansion ratio) of the foam in the intumescent char.

Throughout this description and in the appended claims, use of the singular includes the plural and plural encompasses singular, unless specifically stated otherwise. For example, although reference is made herein to "a" film forming resin, "an" acid source, "a" gas source, "a" non-ionic surfactant, "an" aqueous carrier, and "a" carbon source, one or more of any of these components and/or any other components described herein can be used.

The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of". For example, while certain aspects of the invention have been described in terms of an aqueous intumescent coating composition obtained by forming a mixture comprising a film forming resin, an acid source, a gas source, and a non-ionic surfactant, a mixture "consisting essentially of" or "consisting of" a film forming resin, an acid source, a gas source, and a non-ionic surfactant is also within the present scope. In this context, "consisting essentially of" or "consisting of" means that any additional components will not materially affect the intumescent characteristics of the intumescent coatings of the present invention and/or will not materially affect the overall percentage or range of improvement of the intumescent characteristics of the intumescent coatings of the present invention over coating compositions lacking the non-ionic surfactant.

Furthermore, the use of "or" means "and/or" unless specifically stated otherwise. As used herein, the term "polymer" refers to prepolymers, oligomers and both homopolymers and copolymers, and the prefix "poly" refers to two or more. "Including" and like terms means including, but not limited to. When ranges are given, any endpoints of those ranges and/or numbers within those ranges can be combined within the scope of the present invention.

As used herein, the terms "on", "applied on/over", "formed on/over", "deposited on/over", "overlay" and "provided on/over" mean formed, overlay, deposited, or provided on but not necessarily in contact with the surface. For example, a coating layer "formed over" a substrate does not preclude the presence of one or more other coating layers of the same or different composition located between the formed coating layer and the substrate.

The term "cure", "cured" or similar terms, as used in connection with a cured or curable composition, e.g., a "cured composition" or "cured coating" of some specific description, means that at least a portion of the film-forming resin or "binder" components that form the coating are polymerized and/or crosslinked, or are dried to form a hardened film. Curing or drying reactions to form the hardened film may be carried out under ambient conditions. By "ambient conditions" is meant the condition of surroundings without adjustment of the temperature, humidity or pressure. Usually ambient temperature ranges from 60 to 90° F. (15.6 to 32.2° C.), such as a typical room temperature, 72° F. (22.2° C.). Once cured or dried, a film-forming resin is stable on exposure to solvents and to moderate heat (temperatures of less than 100° C.).

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Unless otherwise indicated, molecular weights are reported as weight average molecular weights determined by gel permeation chromatography relative to polystyrene standards with the unit of g/mol.

The present invention provides an aqueous intumescent coating composition comprising a film forming resin, an acid source, and a non-ionic surfactant. A cured coating deposited from the aqueous intumescent coating composition, when heated according to EN1363-1 on a 1 foot I-shaped W6×16 mild steel column substrate, may have a char expansion ratio of 40 to 75, such as 45 to 65, or 50 to 75, or 55 to 75. The intumescent char formed therefrom may have a 20 percent reduction in char cracking as compared to the same coating without the surfactant. The intumescent char may provide a time to 620° C. of greater than 50 minutes for a 1000 μm coating on a 1 foot I-shaped W6×16 mild steel column substrate, tested according to EN13381-8 after the coating was dried for 1 week at 22° C. followed by 1 week at 40° C.

The non-ionic surfactant may have a hydrophilic-lipophilic balance (HLB) of 9 to 20, such as 12 to 19. The non-ionic surfactant may be a non-ionic silicone surfactant. The non-ionic surfactant may be a non-ionic silicone surfactant comprising 10 to 50 percent by weight siloxane, 30 to 90 percent by weight of an alkylene oxide such as ethylene oxide and/or propylene oxide, and a weight average molecular weight of 500 to 12,000 g/mol, wherein the percent by weight is based on the total weight of the non-ionic silicone surfactant. The non-ionic surfactant may be a non-ionic fluorosurfactant such as, for example, a fluoroethoxylate.

Certain optional components may additionally be included in the aqueous intumescent coating composition, such as an aqueous solvent, a carbon source, a gas source, an inorganic nucleating agent and/or inorganic filler, a pigment, a rheology modifier, a flame retardant, and/or a char reinforcer.

The aqueous intumescent coating compositions contain a film forming resin, which may be included in amounts of 5 to 30 percent by weight, such as 10 to 20 percent by weight, based on the total weight of the coating composition.

The film forming resin may be supplied as a solid or may be supplied in a carrier liquid, such as an organic or aqueous solvent. As such, the film forming resin may be an aqueous or waterborne resin, or a solventborne resin. While solventborne resins are possible in the present invention, it may be desired that the total amount of solvent contributed to the aqueous intumescent coating from the film forming resin be kept below an amount that would contribute to the destabilization of the non-ionic surfactants of the present invention. This amount may depend on the solvent(s) in which the film forming resin is supplied. Aqueous or waterborne resins may be essentially or completely free of organic solvents.

"Essentially free" of a material may be taken to mean that a composition has only trace or incidental amounts of a given material, and that the material is not present in an amount sufficient to affect properties of the composition such as, for example, the curing or intumescent properties. In other words, these materials are not essential to the composition and hence the composition is free of these materials in any appreciable amount. If they are present, it is typically less than 0.1 percent by weight or volume, based on the total weight of, or total volume of, respectively, the composition. "Completely free" of a material may be taken to mean that a composition has no measureable amount of a given material.

The film forming resin may be an aqueous dispersion of polymeric particles, including: (meth)acrylics, vinyls, polyesters, polycarbonates, polylactides, polyethers, polysulfones, polyurethanes, polyamides, chlorinated polyolefins, polyureas, epoxies, and mixtures or copolymers thereof. Latex polymers are readily synthesized at modest cost and provide a suitable class of aqueous dispersions of polymer particles. Latex polymers are typically prepared through chain-growth polymerization, using one or more olefinic compounds (such as monomers). Non-limiting examples of olefinic compounds which may be used to prepare latex polymers include ethylene, butadiene, propene, butene, iso-butene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, acetoacetyl ethyl methacrylate (AAEM), diacetone acrylamide, dimethylaminomethacrylate, dimethylaminomethacrylate, N-hydroxy(meth)acrylamide, vinyl ether maleate, vinyl esters of VERSATIC™ acid (VERSATIC acid is a synthetic saturated monocarboxylic acid of highly branched structure containing about 5 to about 10 carbon atoms), and mixtures thereof.

Particularly suitable film forming resins include vinyl acetate based resins such as, for example, polyvinyl acetate, copolymers of vinyl acetate-ethylene, copolymers of vinyl acetate-vinyl esters of carboxylic acids such as neodecanoic acid, or combinations thereof.

The intumescent coating compositions may be essentially free of phenol formaldehyde prepolymers, or polyimides which form on heating a monomer mixture of a polyisocyanate, polycarboxylic acid, and furfuryl alcohol at temperatures above 110° C. Further, the intumescent coating compositions may be completely free of phenol formaldehyde prepolymers or polyimides formed with furfuryl alcohol.

The intumescent coating compositions may also contain an aqueous solvent which is separate from any solvent supplied with the film forming resin, the acid source, or the non-ionic surfactant. Aqueous solvents include water as a major component. The aqueous solvent may be included in the intumescent coating at from 5 to 40 percent by weight, such as 10 to 30 percent by weight, or even 10 to 25 percent by weight, based on the total weight of the intumescent coating composition.

The intumescent coating compositions contain a non-ionic surfactant. As indicated above, the non-ionic surfactants of the present invention have been found to stabilize the intumescent char formed on exposure of a coating deposited from the inventive coating compositions to high heat, such as in a fire event. This stabilization may be observed as an increase in char density, a reduction in the char expansion ratio, an increased elasticity of the char foam, improvements in the mechanical strength and insulating efficiency, and/or a longer shelf-life for the coating composition, relative to the same coating lacking the non-ionic surfactant.

It should be noted that the non-ionic surfactants of the present invention do not produce foam in the coating compositions, but only act to enhance the intumescent properties of the foams which are formed during production of the intumescent char (i.e., on exposure of the deposited and dried non-foamed coating to elevated temperatures and/or flames, such as during a fire event). Thus, while the film-forming resins of the present invention can be selected from polymers that may be foamed when in the liquid state such as, for example, polyurethane, the film forming resins and coating compositions of the present invention are not foamed in the liquid or un-cured state, or upon curing or drying under ambient conditions. Rather, the present inventors have found that inclusion of the non-ionic surfactants of the present invention in an intumescent coating composition improves the foams that are formed after the coating composition has dried or cured, and then been exposed to elevated temperatures and/or flames.

For example, it has been found that a cured coating deposited from a coating composition comprising the non-ionic surfactants of the present invention, when heated according to EN1363-1 on a 1 foot I-shaped W6×16 mild steel column substrate, has a char expansion ratio of 40 to 75, such as 45 to 65, or 50 to 75, or 55 to 75. In general, the foams of the intumescent chars formed by coatings of the present invention may be denser than foams formed from the same coating lacking the non-ionic surfactant. Typical sizes for individual cells in the foamed char of the present invention may be less than 1/25 inch (less than 1 millimeter).

After the carbonaceous char is fully foamed, the char may be more stable due to either or both of an increased elasticity of the foam, observed as a reduction in char cracking relative to chars formed from the same coating lacking the surfactant, and the increased cell density indicated above by the reduced char expansion ratio. For example, when a coating is heated according to EN-1363-1, the resulting intumescent char may be graded by visual inspection on a scale of 1 to 5, with 5 being the best. The intumescent coatings of the present invention show improvements in char density, char adhesion, char slumping and/or char cracking of at least one point (e.g., 5 vs 4, or 4 vs 3), or at least 20 percent (1/5), over chars formed from the same coatings lacking a non-ionic surfactant.

The non-ionic surfactants of the present invention may improve the mechanical strength and insulating efficiency of the intumescent char formed on exposure of a coating deposited from the inventive coating compositions to elevated temperatures and/or flames. Improvements in the insulating efficiency may be observed by longer fire retardant times as compared to the same coating lacking the surfactant (i.e., time to 620° C.). That is, when heated according to EN-1363-1, the time to 620° C. for substrates coated with intumescent coatings containing the non-ionic surfactants of the present invention may be improved, such as by at least 5 percent, or even by at least 10 percent, over substrates coated with the same coatings lacking non-ionic surfactants. For example, the intumescent char may provide a time to 620° C. of greater than 50 minutes for a 1000 μm coating on a 1 foot I-shaped W6λ16 mild steel column substrate, tested according to EN13381-8 after the coating was dried for 1 week at 22° C. followed by 1 week at 40° C.

This combination of improvements in fire performance observed for coatings which include the non-ionic surfactant may provide an extended Hp/A range for the coating compositions as compared to the same coating lacking the surfactant. That is, the thickness of a coating on a section of a building material such as, for example, a steel beam, may depend on the ratio of the cross sectional perimeter (Hp) and the cross-sectional area (A), or the Hp/A range. The intumescent coating compositions of the present invention may prolong the time for the substrate to reach critical failure temperatures and thus may provide for lower dry film thickness (DFT) loadings on a substrate to attain sufficient or the same fire protection as coatings lacking the non-ionic surfactants of the present invention. Furthermore, when applied at the same DFT, the inventive coatings may extend the Hp/A range over which they provide sufficient or the same fire protection as compared to the same coating lacking the surfactant.

One measure for quantifying the hydrophilic and hydrophobic content of a non-ionic surfactant is the HLB (hydrophilic-lipophilic balance). The non-ionic surfactants included in the coatings of the present invention may have an HLB of 9 or greater, such as 9 to 20, or 12 to 19. HLB, as reported herein, is calculated according to the method defined in the publication by W. C. Griffin, J. Soc. Cosm. Chem. 1954 (Vol. 5), pages 249-256, and shown below in EQ. 1:

$$\text{HLB} = 20 \times [M_H/M] \qquad \text{EQ. 1}$$

wherein $M_H$ is the molecular weight of the hydrophilic portion of the molecule and M is the total molecular weight of the molecule giving a result on a scale of 0 to 20. An HLB value of 0 calculated according to the Griffin method corresponds to a completely lipophilic/hydrophobic molecule, and a value of 20 corresponds to a completely hydrophilic/lipophobic molecule.

A low HLB indicates a non-ionic surfactant that has high solubility in oil; a high HLB value indicates a non-ionic surfactant that has high solubility in water or other polar solvents. The non-ionic surfactants of the present invention may have HLB values that provide solubility in aqueous compositions, such as an HLB of 9 or greater, such as 9 to 20, or 12 to 19.

The non-ionic surfactants of the present invention may be non-ionic silicone surfactants having an HLB of 9 or greater, such as 9 to 20, or 12 to 19.

The non-ionic surfactants of the present invention may be non-ionic silicone surfactants comprising 10 to 50 percent by weight siloxane, such as 10 to 30 percent by weight, wherein the percent by weight is based on the total weight of the non-ionic silicone surfactant. Further, the non-ionic silicon surfactants of the present invention may comprise 30 to 90 percent by weight of an alkylene oxide such as ethylene oxide and/or propylene oxide, such as 50 to 75 percent by weight, wherein the percent by weight is based on the total weight of the silicone surfactant. The non-ionic silicon surfactants of the present invention may have a weight average molecular weight of 500 to 12,000 g/mol, such as 2,000 to 8,000 g/mol.

Exemplary non-ionic surfactants include silicone surfactants such as silicone polyether copolymers (e.g., graft or block style hydrolytically stable silicone polyethers). When based on the weight of the surfactant and the film forming resin in the intumescent coating composition, silicone surfactants are generally included in the composition at from 2 to 10 percent by weight, such as 4 to 8 percent by weight.

When based on the total weight of the intumescent coating composition, the silicone surfactants are generally included in the intumescent coating composition at from 0.3 to 3 percent by weight, such as 0.5 to 2 percent by weight, 0.5 to 1.8 percent by weight, or even 0.5 to 1.5 percent by weight. Compositions comprising more than 3 percent by weight of the silicone surfactants (based on the total weight of the coating composition) may demonstrate reduced fire performance, such as increased slumping and reduced adhesion of the intumescent char on the substrate as compared to the same coating comprising 3 percent or less of the silicone surfactants.

Exemplary non-ionic silicone surfactants may have the formula:

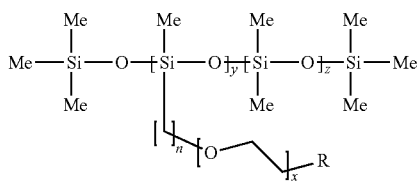

wherein y and z together are selected so that the non-ionic silicone surfactant comprises a total of 10 to 50 percent by weight siloxane, such as 10 to 30 percent by weight siloxane; x is 4 to 18; n is 1 to 6, such as 2 to 4, or 3; and x and y together are selected so that the non-ionic silicone surfactant comprises a total of 30 to 90 percent by weight of an alkylene oxide such as ethylene oxide and/or propylene oxide, such as 50 to 75 percent by weight, wherein the percent by weight is based on the total weight of the non-ionic silicone surfactant. The end cap R may comprise methyl, hydroxyl, or alkoxy groups, wherein hydroxyl groups are particularly suitable. Further, suitable weight average molecular weights for the exemplary non-ionic silicone surfactant may be 500 to 12,000 g/mol, such as 2,000 to 8,000 g/mol.

Another exemplary non-ionic surfactant includes non-ionic fluorosurfactants, which are generally included in the intumescent coating composition at from 0.05 to 0.4 percent by weight, such as 0.05 to 0.2 percent by weight, based on the total weight of the intumescent coating composition.

Exemplary non-ionic fluorosurfactants include fluorosurfactants containing polyethylene glycol polymers, polypropylene glycol polymers, and copolymers thereof. In some embodiments, the nonionic fluorosurfactant comprises polyoxyethylene fluoroalkyl ethers, or polyoxyethylene fluoroalkylphenyl ethers. Exemplary non-ionic fluorosurfactants also include fluoroethoxylates. For example, the non-ionic fluorosurfactants may include fluoroalkyl polyethoxylated surfactants having the formula:

$$F(CF_2)_a\text{—}(CH_2CH_2O)_b\text{—}H$$

In the above formula, a and b are integers, such that a may be less than 10 and b may range from 1 to 16. A commercial example of such a fluorosurfactant includes, for example, at least Capstone® FS-31.

For fluoroethoxylate surfactants, an HLB may be calculated according to EQ. 2:

$$HLB = 20 \times [M_{ethoxylate} \times N)/M] \quad \text{EQ. 2}$$

wherein $M_{ethoxylate}$ is the molecular weight of the ethoxylate group, N is the number of ethoxylate groups on the molecule, and M is the total molecular weight of the molecule giving a result on a scale of 0 to 20.

Under the influence of heat, typically between 100° C. and 200° C., the film forming resin and certain other components of the intumescent coating may melt and begin to flow. As the temperature increases (>200° C.), the acid source, usually by decomposition, produces copious amounts of acid which can react with other constituents in the coating. If the acid source is a polyphosphate, polyphosphoric acids are released which can react with the carbon source, for example a polyhydric alcohol, to form polyphosphoric acid esters. The decomposition of these esters leads to the formation of carbon compounds, which together with the produced gases, for example gases released by a blowing agent or by reactions between the acid source and the film-forming resin, give rise to a carbon foam or char.

The intumescent coating compositions contain an acid source, examples of which include phytate derivatives, ammonium polyphosphate, melamine phosphate, magnesium sulphate, ammonium pentaborate, zinc borate, boric acid, and salts of sulphonic acid. The acid source is typically included in the intumescent coating at from 5 to 40 percent by weight, such as 10 to 35 percent by weight, or 20 to 30 percent by weight, based on the total weight of the intumescent coating composition.

Particularly suitable as an acid source is ammonium polyphosphate, often abbreviated "APP", because it has a high phosphorus content and because it yields phosphoric acid at temperatures below the decomposition temperatures of the optional carbon and gas sources described below, and yet above the normal temperatures used for processing the intumescent composition. The ammonium polyphosphates are polymeric phosphates, having P—O—P linkages, which may be represented by the formula: $H_{n-m+2}(NH_4)_m P_n O_{3m+1}$, wherein the average value of n is at least about 10, the average value of m is a number up to n+2, and the ratio m/n is in the range of from about 0.7 to about 1.2. The values of n and m for any particular compound will be positive integers, while the average values of n and m for a mixture of compounds constituting the ammonium polyphosphate may each individually be a positive integer or a positive number which is not an integer. Particularly useful ammonium polyphosphates in the intumescent coating compositions of the present invention include those having values of n>1000.

The intumescent coating compositions generally contain a compound, or group of compounds, capable of releasing gas upon exposure to heat ("gas source"). These gases, typically oxygen, nitrogen, carbon dioxide, sulfur dioxide, ammonia gas, or mixtures thereof, act as a blowing agent to foam the carbonaceous char. The gas may be formed by the reaction of certain components of the intumescent coating such as, for example, by reactions between the acid source and the film-forming resin upon exposure to heat. As such, blowing or gas production may be initiated at temperatures which the acid source decomposes (>200° C.) to form the acid which may react with the film-forming resin.

Alternatively, or in addition, the gas source may be added as a separate component in the coating composition. Suitable gas sources include compounds which decompose, or are activated, to form gases (e.g., oxygen, nitrogen, carbon dioxide, sulfur dioxide, and/or ammonia gas) above 200° C., for example in the range of 200 to 400° C. Suitable gas sources include polymeric materials, and/or certain monomeric materials or mixtures thereof that may form polymers or copolymers upon curing, and which break down at these elevated temperatures to release gases. Exemplary polymeric materials which may be used as a gas source include polylactides that decompose at temperatures of 200° C. to 350° C. as determined by thermogravimetric analysis (TGA). Further exemplary polymeric materials include at least polysulfones, polycarbonates, polyethers, and/or polyesters.

Other suitable gas sources include nitrogen containing compounds such as melamine, melamine salts, melamine derivatives, urea, dicyandiamide, guanidine, and cyanurates. Specific additional examples include glycine, melamine phosphate, melamine borate, melamine formaldehyde, melamine cyanurate, tris-(hydroxyethyl) isocyanurate (THEIC), or chlorinated paraffin. The gas source, when included as a separate component of the intumescent coating composition, may be included at from 3 to 20 percent by weight, such as 3 to 15 percent by weight, or even 8 to 12 percent by weight, based on the total weight of the intumescent coating composition.

The intumescent coating compositions may contain a carbon source which can be a liquid carbon source, a solid carbon source, or a combination thereof. The carbon source may be provided by the film forming resin and/or any polymeric materials used as a gas source. These materials, when exposed to heat such as in a fire event, may react with the acid source to form the intumescent char. Additional carbon sources may be added to enhance formation of the carbonaceous char. Exemplary additional carbon sources include organic polyhydroxy-functional compounds, such as the solid carbon sources pentaerythritol, dipentaerythritol, and tripentaerythritol. Starch, sugars, oligomers of polyols, glycerin, and expandable graphite are other exemplary additional carbon sources. The additional carbon source, if used, may be included in the intumescent coating composition from 0.1 to 20 percent by weight, such as 3 to 15 percent by weight, or even 8 to 12 percent by weight, based on the total weight of the intumescent coating composition.

Inorganic "nucleating" agents may also be included in the intumescent coating compositions of the present invention as they provide sites for the intumescent char to form, and improve the thermal resistance properties and stability of the intumescent char during a fire. Thus, the intumescent coating compositions of the present invention may contain a nucleating agent, examples of which include titanium dioxide, zinc oxide, aluminium oxide, silica, silicates, heavy metal oxides such as cerium oxide, lanthanum oxide and zirconium oxide, calcium carbonite, carbon black, talcum, wollastonite, micaceous iron oxide, china clay, mica and bentonite clay. A nucleating agent such as titanium dioxide may also provide opacity to the coating. The nucleating agent, if used, may be included in the intumescent coating at from 3 to 20 percent by weight, such as 3 to 15 percent by weight, or even 8 to 12 percent by weight, based on the total weight of the intumescent coating composition.

Further additives may be optionally included as part of the intumescent ingredients, such as to aid char formation and to strengthen the char and prevent char degradation (e.g., char reinforcing agents). Such additives include solids such as zinc borate, zinc stannate, zinc hydroxystannate, glass flake, glass spheres, polymeric spheres, fibers (ceramic, mineral, glass/silica based), aluminium hydroxide, antimony oxide, boron phosphate, fumed silica. Particularly suitable fibers include engineered mineral fibers that are 100 to 5000 microns in length, such as 100 to 1000 microns in length, or even 100 to 500 microns in length. Such additives may be included in the intumescent coating at from 1 to 5 percent by weight, based on the total weight of the intumescent coating composition. These ingredients are typically added to stabilize the char by reducing the char expansion ratio so that the char does not become too "fluffy," or large to remain stable. Inclusion of the non-ionic surfactants in the coating compositions of the present invention may negate or reduce the need for these other stabilizing agents.

Further, rheology modifiers, such as a thixotrope may be included in the intumescent coating composition. Suitable thixotropic additives include organically modified inorganic clays such as bentonite clays, hectorite clays or attapulgite clays, organic wax thixotropes based on castor oil and castor oil derivatives, and fumed silica.

To improve or facilitate dispersion of the intumescent ingredients in the intumescent coating, it may be desirable to incorporate wetting/dispersion additives. Such additives are usually liquid in form and can be supplied either containing a solvent or may be solvent free. Wetting/dispersion additives are differentiated from the non-ionic surfactants of the present invention by their lower HLB values (e.g., HLB<9). Furthermore, such additives are typically not silicones and are ionic in nature, being supplied as salts of carboxylates.

The intumescent compositions of the present invention may further comprise a halogenated polymeric resin as a flame retardant and/or char expansion agent. A particularly suitable flame retardant includes chlorinated paraffin, which may be included in the composition at from 0.1 to 15 percent by weight, such as 2 to 10 percent by weight, based on the total weight of the intumescent coating composition.

The present invention is further drawn to substrates at least partially coated with an intumescent coating composition as described herein. Substrates to which these compositions may be applied include rigid metal substrates, such as ferrous metals, aluminum, aluminum alloys, copper, and other metals or alloys. Exemplary ferrous metal substrates useful in the practice of the present invention include iron, steel, and alloys thereof.

Steel sections requiring fire protection are normally blast cleaned prior to the application of an intumescent coating to remove millscale and other deposits that may lead to premature failure of the intumescent coating, either on prolonged atmospheric exposure or during a fire situation. In order to prevent deterioration of the blast cleaned surface, particularly where there is a delay in applying the intumescent coating, it is normal practice to apply a primer coating. This is often the case when the intumescent coating is applied on site.

Examples of suitable primers are coatings based on epoxy, modified epoxy (such as modified with polyvinyl butyral), polyurethane, acrylic, vinyl and chlorinated rubber. The thickness of the primer may be in the range from 15 microns to 250 microns, such as in the range from 25 microns to 100 microns.

A topcoat may be applied to the cured intumescent coatings of the present invention, particularly to provide color to exposed steelwork. A topcoat may enhance the durability of the intumescent coating compositions. A clear sealer may also be suitable. Examples of suitable topcoats are coatings based on epoxy, polyurethane, alkyd, acrylic, vinyl or chlorinated rubber. The thickness of the topcoat can vary from 15 microns to 250 microns, such as from 25 microns to 75 microns; depending on the needs of the user, a thickness too high may inhibit the intumescent reactions.

Each of the characteristics and examples described above, and combinations thereof, may be said to be encompassed by the present invention. The present invention is thus drawn to the following non-limiting aspects:

(1) An aqueous intumescent coating composition comprising: a film forming resin; a non-ionic surfactant having a hydrophilic-lipophilic balance (HLB) of 9 to 20; and an acid source.

(2) The coating composition according to aspect 1, wherein the non-ionic surfactant has an HLB of 12 to 19.

(3) The coating composition according to any of aspects 1 or 2, wherein the non-ionic surfactant comprises a silicone surfactant included at 0.3 to 3 percent by weight, such as 0.5 to 2 percent by weight, based on the total weight of the coating composition.

(4) The coating composition according to any of aspects 1 to 3, wherein the non-ionic surfactant comprises a silicone surfactant which comprises 10 to 50 percent by weight siloxane, 30 to 90 percent by weight of an alkylene oxide such as ethylene oxide and/or propylene oxide, and a molecular weight of 500 to 12,000 g/mol, wherein the percent by weight is based on the total weight of the silicone surfactant.

(5) The coating composition according to any of aspects 1 to 4, wherein the non-ionic surfactant comprises a silicone surfactant comprising the formula:

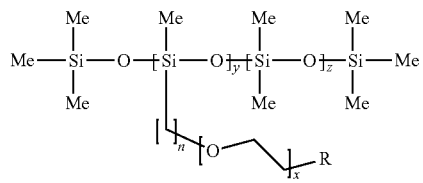

wherein R is a methyl group, hydroxyl group, or alkoxy group; z and y together are selected so that the non-ionic silicone surfactant comprises 10 to 30 percent by weight siloxane; x is 4 to 18; n is 1 to 6, such as 2 to 4, or 3; and x and y together are selected so that the non-ionic silicone surfactant comprises 50 to 75 percent by weight of an alkylene oxide such as ethylene oxide and/or propylene oxide, wherein the percent by weight is based on the total weight of the non-ionic silicone surfactant.

(6) The coating composition according to any of aspects 1 to 5, comprising: 5 to 30 percent by weight of the film forming resin; 0.5 to 2 percent by weight of the non-ionic silicone surfactant; 5 to 40 percent by weight the acid source; and 10 to 30 percent by weight of an aqueous solvent, wherein the percent by weight is based on the total weight of the coating composition.

(7) The coating composition according to any of aspects 1 or 2, wherein the non-ionic surfactant comprises a fluoroethoxylate surfactant included at 0.05 to 0.4 percent by weight, such as 0.05 to 0.2 percent by weight, based on the total weight of the coating composition.

(8) The coating composition according to any of aspect 1, 2, or 7, comprising: 5 to 30 percent by weight of the film forming resin; 0.05 to 0.2 percent by weight of the non-ionic fluoroethoxylate surfactant; 5 to 40 percent by weight the acid source; and 10 to 30 percent by weight of an aqueous solvent, wherein the percent by weight is based on the total weight of the coating composition.

(9) The coating composition according to any of aspects 1 to 8, wherein the film forming resin comprises an aqueous emulsion of a vinyl styrene acrylic resin, a polyvinyl acetate resin, a cycloaliphatic resin, or a combination thereof.

(10) The coating composition according any of aspects 1 to 8, wherein the film forming resin comprises a vinyl acetate based resin.

(11) The coating composition according to any of aspects 1 to 10, wherein the acid source is selected from phosphoric esters of polyhydroxy compounds, ammonium phosphates or amine phosphates.

(12) The coating composition according to any of aspects 1 to 11, wherein the acid source comprises ammonium polyphosphate (APP).

(13) The coating composition according to any of aspects 1 to 12, further comprising a gas source, wherein the gas source may be included in the coating composition at 3 to 20 percent by weight, based on the total weight of the coating composition.

(14) The coating composition according to aspect 13, wherein the gas source comprises a polymeric material or a nitrogen containing material which decomposes to form gases above 200° C., such as 200° C. to 400° C.

(15) The coating composition according to aspect 13 or 14, wherein the gas source comprises melamine.

(16) The coating composition according to aspects 13 or 14, wherein the gas source comprises a polymeric material selected from polylactides, polysulfones, polycarbonates, polyethers, polyesters, or mixtures thereof.

(17) The coating composition according to any of aspects 1 to 16, further comprising a carbon source different from the film forming resin.

(18) The coating composition according to aspect 17, wherein the carbon source may be included in the composition in an amount of 0.1 to 20 percent by weight, based on the total weight of the intumescent coating composition.

(19) The coating composition according to aspects 17 or 18, wherein the carbon source comprises pentaerythritol.

(20) The coating composition according to any of aspects 1 to 19, wherein the coating composition is essentially free of phenol formaldehyde prepolymers or polyimides formed with furfuryl alcohol.

(21) The coating composition according to any of aspects 1 to 20, further comprising a nucleating agent.

(22) The coating composition according to any of aspects 1 to 21, further comprising a rheology modifier.

(23) The coating composition according to any of aspects 1 to 22, further comprising an inorganic filler.

(24) The coating composition according to any of aspects 1 to 23, further comprising a flame retardant.

(25) The coating composition according to any of aspects 1 to 24, wherein a cured coating deposited from the coating composition, when heated according to EN1363-1 on a 1 foot I-shaped W6×16 mild steel column substrate, forms an intumescent char having a char expansion ratio of 40 to 75, such as 45 to 65, or 50 to 75, or 55 to 75.

(26) The coating composition according to any of aspects 1 to 24, wherein a cured coating deposited from the coating composition provides a time to 620° C. of greater than 50 minutes for a 1000 μm coating on a 1 foot I-shaped W6×16 mild steel column substrate, tested according to EN13381-8 after the coating was dried for 1 week at 22° C. followed by 1 week at 40° C.

(27) The coating composition according to any of aspects 1 to 24, wherein a cured coating deposited from the coating composition, when heated according to EN1363-1 on a 1 foot I-shaped W6×16 mild steel column substrate, shows a 20% improvement (reduction) in char cracking relative to a coating lacking the non-ionic surfactant.

(28) A substrate coated at least in part with the aqueous intumescent coating composition according to any of aspects 1 to 27.

(29) A method for improving fire performance of an intumescent coating, comprising: adding 0.5 to 2 percent by weight of a non-ionic silicon surfactant having an HLB of 9 to 20 to an aqueous intumescent coating composition, wherein the percent by weight is based on the total weight of the coating composition, and wherein the non-ionic silicon surfactant is defined as in any of aspects 4 or 5.

(30) The method according to aspect 29, wherein the non-ionic silicone surfactant has an HLB of 12 to 19.

(31) A method for improving fire performance of an intumescent coating, comprising: adding 0.05 to 0.2 percent by weight of a non-ionic fluoroethoxylate surfactant having an HLB of 9 to 20 to an aqueous intumescent coating composition, wherein the percent by weight is based on the total weight of the coating composition.

(32) The method according to aspect 31, wherein the non-ionic fluoroethoxylate surfactant has an HLB of 12 to 19.

(33) A substrate coated with a coating formed by the method according to any of aspects 29 to 32.

EXAMPLES

The following examples are intended to illustrate the invention, and should not be construed as limiting the invention in any way. Percentages of components are by weight unless otherwise indicated.

Example A

Intumescent coating formulations were prepared with a Dispermat-type dissolver equipped with a heavy duty stainless steel dispersion impeller. The aqueous paints were prepared using water and the liquid additives as grind vehicle for the pigment. The pigment was slowly added at low peripheral speed to maintain a temperature <25° C. After all pigment was added, a homogeneous dispersion was obtained by high speed mixing to 35° C. The resin emulsion and surfactant, and any rheology modifier, were then added at low peripheral speed and homogenized for 5 minutes. Inventive (coatings 2-5) and comparative (coating 1) formulations are listed in Table 1.

TABLE 1

| INGREDIENT FUNCTION | INGREDIENTS | PARTS BY WEIGHT (g) | | | | |
| --- | --- | --- | --- | --- | --- | --- |
| | | Coating 1* | Coating 2 | Coating 3 | Coating 4 | Coating 5 |
| SOLVENT | Water | 20.00 | 19.81 | 19.81 | 19.81 | 19.98 |
| RHEOLOGY ADDITIVE | Hydroxyethyl cellulose | 0.25 | 0.25 | 0.25 | 0.25 | 0.25 |
| RHEOLOGY ADDITIVE | Non-ionic polyurethane emulsion | 1.00 | 0.99 | 0.99 | 0.99 | 1.00 |
| WETTING/DISPERSING AGENT | Sodium salt of carboxylate | 0.20 | 0.20 | 0.20 | 0.20 | 0.20 |
| DEFOAMER | Foamaster NDW | 0.20 | 0.20 | 0.20 | 0.20 | 0.20 |
| BIOCIDE | Acticide OTW 8 | 0.10 | 0.10 | 0.10 | 0.10 | 0.10 |
| COALESCENT | Texanol | 2.00 | 1.98 | 1.98 | 1.98 | 2.00 |
| PIGMENT | Titanium dioxide | 8.95 | 8.86 | 8.86 | 8.86 | 8.94 |
| CARBON SOURCE | Pentaerythritol | 8.95 | 8.86 | 8.86 | 8.86 | 8.94 |
| ACID SOURCE | Ammonium polyphosphate | 26.83 | 26.57 | 26.57 | 26.57 | 26.81 |
| GAS SOURCE | Melamine | 8.95 | 8.86 | 8.86 | 8.86 | 8.94 |
| INORGANIC FILLER | China Clay E | 4.00 | 3.96 | 3.96 | 3.96 | 4.00 |
| RESIN | Polyvinylacetate emulsion | 18.56 | 18.38 | 18.38 | 18.38 | 18.54 |
| NON-IONIC SURFACTANT | Xiameter OFX-0193 | — | 0.99 | — | — | — |
| | Tegostab 8002 | — | — | 0.99 | — | — |
| | Dow corning 11-100 | — | — | — | 0.99 | — |
| | Capstone FS-31 | — | — | — | — | 0.1 |

*Comparative Example;
Xiameter ® OFX-0193 is a silicone polyether copolymer; Tegostab ® B8002 is a silicone surfactant; Dow Corning ® 11-100 is a silicone surfactant which includes alkoxy and alkyl functional groups on siloxane; and Capstone ® FS-31 is a non-ionic fluorosurfactant.

Example B

The paints listed in Table 1 were stored for 24 hours at 20° C. prior to application. The paints were applied on 1 foot I-shaped W6×16 mild steel columns in two 500 micrometer dry film thickness coats. The first coat was allowed to dry for 48 hours at 20° C. before application of the second coat. The paints were sprayed using a SataJet 1000B air assisted paint sprayer, operating at 2-3 bar with a 2.0 mm nozzle. The samples were dried for 1 week at ambient conditions followed by 1 week at 40° C. Final film thickness of paint was measured before fire testing, which was performed in accordance with EN13381-8. Fire tests were stopped when a steel temperature of 650° C. was reached. Final film thickness of each coating was measured using an Elcometer 456.

Performance characteristics for the formulations listed in Table 1 are provided in Table 2. The char expansion ratio was determined by measuring the volume increase of the char on the steel beam at 8 points equally spread over its surface. Char cracking and char slumping were visually inspected. The char was removed from the steel and cut to assess adhesion, density and size of the air pockets. All physical properties (density, cracking, slumping, and adhesion) were rated on a scale of 1 to 5, 1 being the worst and 5 being the best.

Improved fire performance, as determined by improvements in the char density, char cracking, char slumping, and char adhesion, was obtained for cured coatings deposited from coating compositions comprising a non-ionic surfactant of the present invention. For example, char cracking was reduced by at least 20 percent (Table 2: inventive examples 2-5 show a value of 5 vs. comparative example 1 shows a value of 3) and char density was improved by at least 20 percent (Table 2: inventive examples 2, 3, and 4 show a value of 4 or 5 vs. comparative example 1 shows a value of 3).

TABLE 2

|  | Coating 1* | Coating 2 | Coating 3 | Coating 4 | Coating 5 |
|---|---|---|---|---|---|
| Fire retardant time to 620° C. (min) | 51.2 | 53.3 | 53.9 | 51.3 | 52.2 |
| Char Expansion Ratio | 72 | 62 | 70 | 65 | 74 |
| Char Density** | 3 | 5 | 4 | 4 | 3 |
| Char Cracking** | 3 | 5 | 5 | 5 | 5 |
| Char Slumping** | 4 | 3 | 4 | 5 | 4 |
| Char Adhesion** | 4 | 5 | 4 | 4 | 3 |
| HLB Value | 0 | 12.3 | 18.2 | 10.6 | 9 |

*Comparative Example;
**Scale 1-5, 1 being the worst and 5 being the best result;
TBD—to be determined.

The best fire performance, as measured by an increase in the time to 620° C., was observed for coatings having a char expansion ratio in the range of 40 to 75, such as 55 to 75 as observed for the inventive coatings in Table 2, or even 60 to 70. That is, a cured coating deposited from the inventive coatings, when heated according to EN1363-1 on a 1 foot I-shaped W6×16 mild steel column substrate, has a char expansion ratio of 40 to 75, such as 45 to 65, or 55 to 75, or even 60 to 70. While the fire retardant time for Coating 5 is observed to be better than for Coating 1 (the comparative example), the higher char expansion ratio (74) is also associated with lower char density and char adhesion than the other inventive examples (Coatings 2-4).

It will be appreciated that the following embodiments and implementations are illustrative and various aspects of the invention may have applicability beyond the specifically described contexts. Furthermore, it is to be understood that these embodiments and implementations are not limited to the particular components, methodologies, or protocols described, as these may vary. The terminology used in the description is for the purpose of illustrating the particular versions or embodiments only, and is not intended to limit their scope in the present disclosure which will be limited only by the appended claims.

What is claimed is:

1. An aqueous intumescent coating composition comprising:
   a film forming resin;
   a non-ionic silicone surfactant having a hydrophilic-lipophilic balance (HLB) of 9 to 20; and
   an acid source,
   wherein a cured coating deposited from the coating composition, when heated according to EN1363-1 on a 1 foot I-shaped W6x16 mild steel column substrate, has a char expansion ratio of 40 to 75.

2. The coating composition of claim 1, wherein the char expansion ratio is 55 to 75.

3. The coating composition of claim 1, wherein the non-ionic silicone surfactant has an HLB of 12 to 19.

4. The coating composition of claim 1, wherein the silicone surfactant is included at 0.2 to 2 percent by weight based on the total weight of the coating composition.

5. The coating composition of claim 1, wherein the silicone surfactant comprises 10 to 50 percent by weight siloxane, 30 to 90 percent by weight alkylene oxide, and a molecular weight of 500 to 12,000 g/mol, wherein the percent by weight is based on the total weight of the silicone surfactant.

6. The coating composition of claim 1, wherein the film forming resin comprises an aqueous emulsion of a vinyl styrene acrylic resin, a polyvinyl acetate resin, a cycloaliphatic resin, or a combination thereof.

7. The coating composition of claim 1, further comprising a carbon source.

8. The coating composition of claim 1, further comprising a gas source, wherein the gas source comprises a polymeric material or a nitrogen containing material which decomposes to form a gas in the temperature range of 200° C. to 400° C.

9. The coating composition of claim 8, wherein the gas source comprises a polylactide, polysulfone, polycarbonate, polyether, polyester, or combination thereof.

10. The coating composition of claim 1, comprising:
    5 to 30 percent by weight of the film forming resin;
    0.05 to 2 percent by weight of the non-ionic silicone surfactant;
    5 to 40 percent by weight the acid source;
    3 to 20 percent by weight of a gas source;
    0.1 to 20 percent by weight of a carbon source; and
    10 to 30 percent by weight of an aqueous solvent,
    wherein the percent by weight is based on the total weight of the coating composition.

11. A substrate coated at least in part with the intumescent coating composition of claim 1.

12. An aqueous intumescent coating composition comprising:
    a film forming resin;
    an acid source; and
    a non-ionic silicone surfactant comprising 10 to 50 percent by weight siloxane, 30 to 90 percent by weight alkylene oxide, and a molecular weight of 500 to 12,000 g/mol, wherein the percent by weight is based on the total weight of the non-ionic surfactant,
    wherein a cured coating deposited from the coating composition, when heated according to EN1363-1 on a 1 foot I-shaped W6x16 mild steel column substrate, has a char expansion ratio of 40 to 75.

13. The coating composition of claim 12, wherein the non-ionic silicone surfactant comprises a formula:

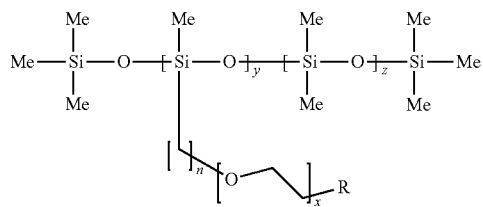

wherein R is a methyl group, hydroxyl group, or alkoxy group; y and z together are selected so that the non-ionic silicone surfactant comprises 10 to 30 percent by weight siloxane; n is 1 to 6; x is 4 to 18; and x and y together are selected so that the non-ionic silicone surfactant comprises 50 to 75 percent by weight alkylene oxide, wherein the percent by weight is based on the total weight of the non-ionic silicone surfactant.

14. The coating composition of claim 12, wherein the char expansion ratio is 55 to 75.

15. The coating composition of claim 12, wherein the non-ionic silicon surfactant is included at 0.2 to 2 percent by weight based on the total weight of the coating composition.

16. The coating composition of claim 12, further comprising a carbon source and an aqueous solvent.

17. The coating composition of claim 12, further comprising a gas source, wherein the gas source comprises a polymeric material or a nitrogen containing material which decomposes to form a gas in the temperature range of 200° C. to 400° C.

18. The coating composition of claim 12, wherein the non-ionic silicone surfactant has an HLB of 9 to 20.

19. A substrate coated at least in part with the intumescent coating composition of claim 12.

20. A method for improving fire performance of an intumescent coating, comprising:
   adding 0.2 to 2 percent by weight of a non-ionic silicon surfactant having an HLB of 9 to 20 to an aqueous intumescent coating composition comprising a film forming resin and an acid source, wherein the percent by weight is based on the total weight of the coating composition,
   wherein the non-ionic silicon surfactant comprises 10 to 50 percent by weight siloxane, 30 to 90 percent by weight alkylene oxide, and a molecular weight of 500 to 12,000 g/mol, wherein the percent by weight is based on the total weight of the non-ionic silicone surfactant, and
   wherein a cured coating deposited from the coating composition, when heated according to EN1363-1 on a 1 foot I-shaped W6x16 mild steel column substrate, has a char expansion ratio of 40 to 75.

21. The method of claim 20, wherein the non-ionic silicone surfactant comprises a formula:

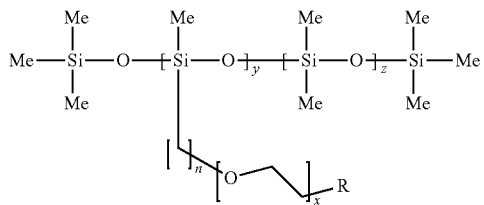

wherein R is a methyl group, hydroxyl group, or alkoxy group; y and z together are selected so that the non-ionic silicone surfactant comprises 10 to 30 percent by weight siloxane; n is 1 to 6; x is 4 to 18; and x and y together are selected so that the non-ionic silicone surfactant comprises 50 to 75 percent by weight alkylene oxide, wherein the percent by weight is based on the total weight of the non-ionic silicone surfactant.

22. The method of claim 20, wherein the non-ionic silicone surfactant has an HLB of 12 to 19.

* * * * *